United States Patent [19]

Johnson et al.

[11] 4,312,253

[45] Jan. 26, 1982

[54] REMOVABLE SCRAP CATCHER ENCLOSURE FOR A BAND SAW

[75] Inventors: Thomas M. Johnson, Troy; John E. Voorhees, Sidney; Raymond P. Shaeffer, Troy, all of Ohio

[73] Assignee: Hobart Corporation, Troy, Ohio

[21] Appl. No.: 151,214

[22] Filed: May 19, 1980

[51] Int. Cl.³ .............................................. B23D 55/00
[52] U.S. Cl. .......................................... 83/167; 83/168
[58] Field of Search ....................................... 83/167, 168

[56] References Cited

U.S. PATENT DOCUMENTS

| | | |
|---|---|---|
| D. 149,203 | 4/1948 | Meeker et al. |
| D. 156,572 | 12/1949 | Spang. |
| 1,494,774 | 5/1924 | Davis. |
| 1,908,727 | 5/1933 | Bleam. |
| 2,423,363 | 7/1947 | Biro. |
| 2,492,824 | 12/1949 | Ahrndt et al. ............... 83/168 X |
| 2,585,957 | 2/1952 | Meeker et al. ................. 83/168 |
| 2,725,082 | 11/1955 | Duron .......................... 83/167 |

*Primary Examiner*—James M. Meister
*Attorney, Agent, or Firm*—Biebel, French & Nauman

[57] ABSTRACT

In a band saw (10) particularly adapted for cutting meat, blade scrapers (25, 26) remove debris from the band saw blade (18) and throw it laterally and forward of the blade (18) into an enclosure (40), which can be removed without the use of tools for cleaning and for disposing of the collected debris. The location of the blade scrapers (25, 26) is slaved to the location of the saw blade (18) to automatically maintain the proper relationship for most efficient debris removal without adjustment.

9 Claims, 11 Drawing Figures

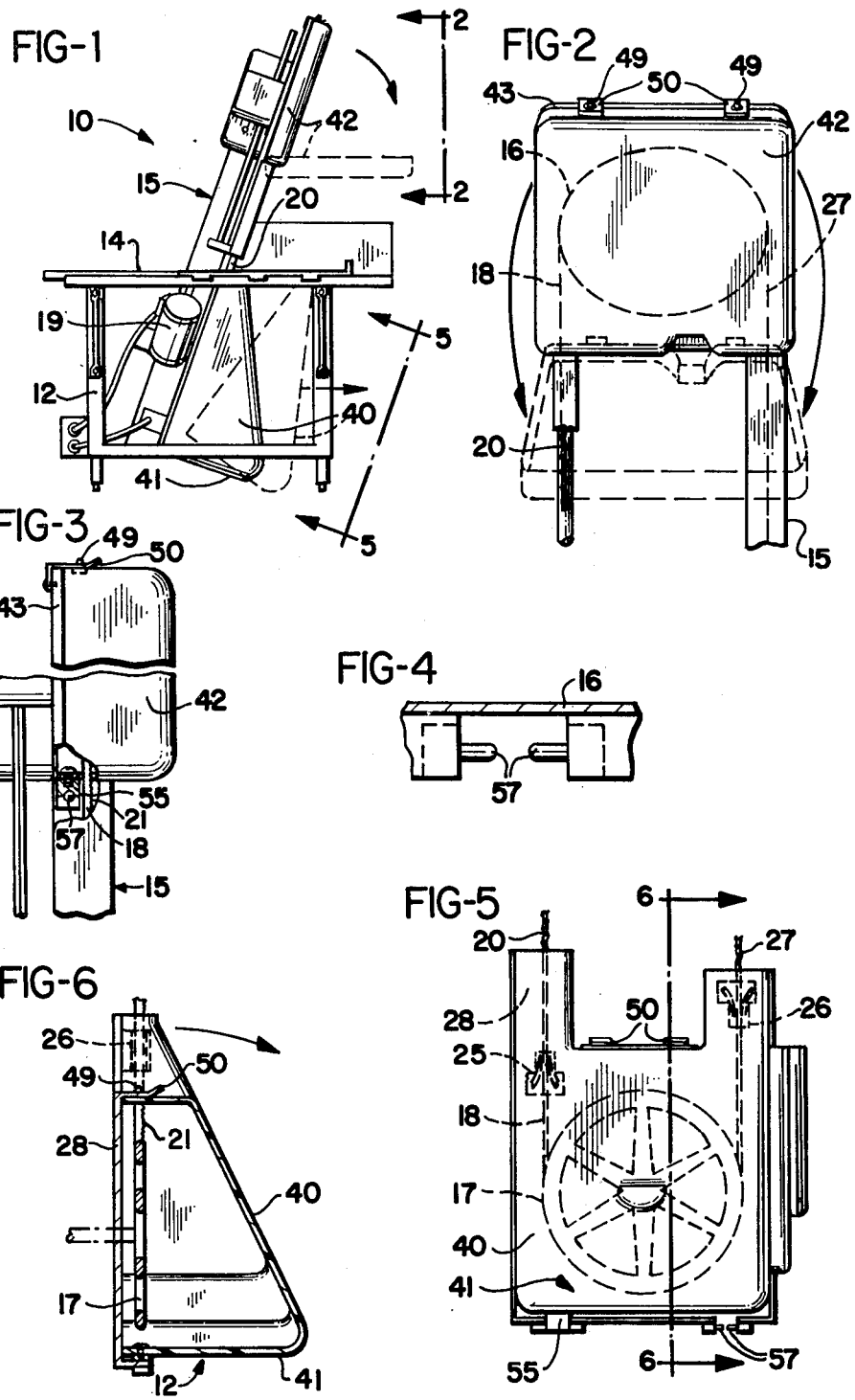

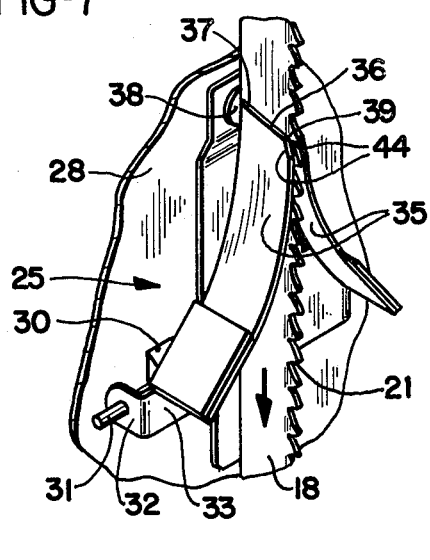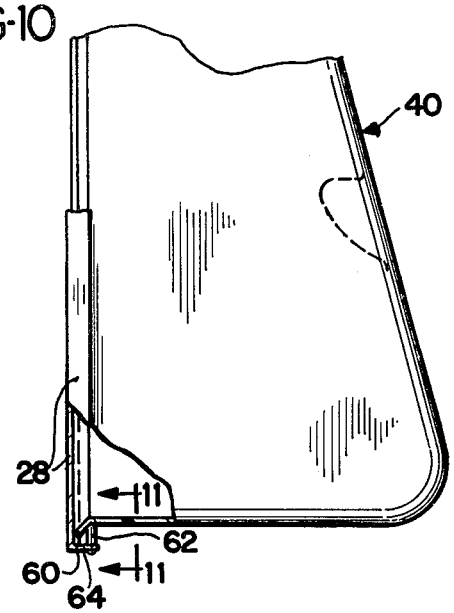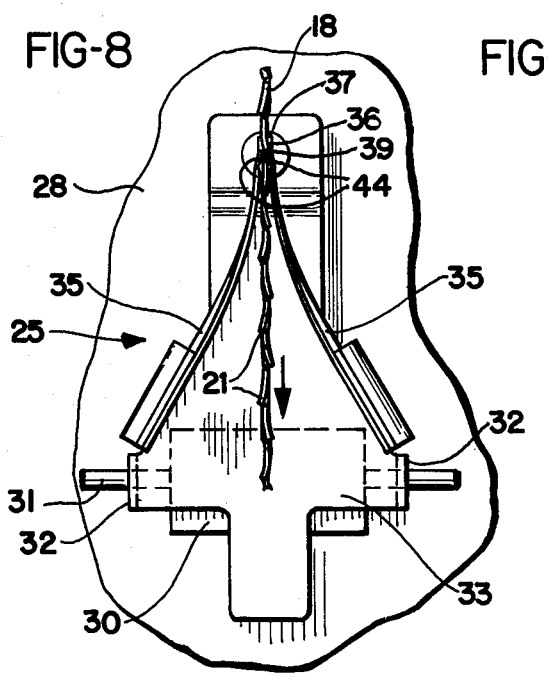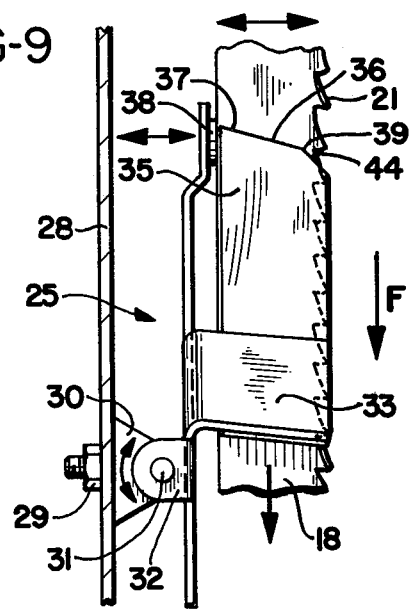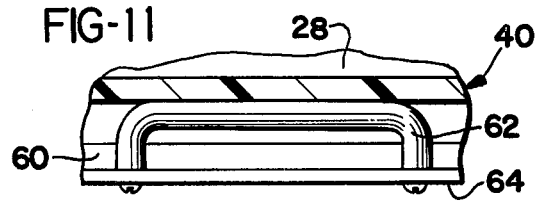

REMOVABLE SCRAP CATCHER ENCLOSURE FOR A BAND SAW

BACKGROUND OF THE INVENTION

This invention relates to band saws especially adapted for cutting meat, and more particularly to a removable scrap catcher enclosure for a meat saw for collecting and removing the scrap debris therefrom. Examples of prior art meat saws may be found in U.S. Pat. Nos. Des. 149,203; 156,572; and U.S. Pat. No. 2,585,957, all assigned to the assignee of the present invention. The '957 patent is apparently the same saw as shown in the '203 design patent.

Many prior art meat saws have provisions for scraping the saw blade and collecting the debris and scraps produced during the meat cutting process. The '957 saw, for example, includes a removable scrap drawer for collecting and removing the meat scraps. This device also includes wheel scrapers and blade wipers, the latter being resin impregnated fabric or the like with beveled faces which are urged toward the band saw blade by torsion springs, for removing scrap debris from the saw blade. The blade wipers contact the saw blade along a line which is generally perpendicular to the path of travel of the saw blade. This orientation causes the debris removed from the blade to be deflected laterally from the blade, necessitating the addition of a sloping deflector surface to cause the material to fall into the scrap drawer rather than back onto the band saw blade or the wheel. Elsewhere in the meat saw, blade guides have beveled offset portions which scrap the sides of the blade and help remove the grease from the blade guide, to a location where it can be removed. Specific provision is also made for conducting debris collected in the saw head down through an integral trough to the drawer.

Unfortunately, not all of the debris is collected within the drawer, and the blade wipers are not able to follow deviations in the saw blade position in the plane of the blade during meat cutting. This may mean less than optimum performance; and the suggestion of a slave blade scraper for causing the edges of the blade wipers to follow the saw blade tooth gullets, as the blade moves when the meat is pressed against it, is lacking from this prior art. It is therefore desirable to make the debris collecting system more efficient not only because it will benefit the overall meat saw operation, but also because it will improve efficiency by requiring less operator attention during a day's work. In this context also, the meat saw should be designed so that cleaning and removal of the debris, in general, will be easy, quick and convenient, to minimize maintenance and down time, and maximize productivity.

SUMMARY OF THE INVENTION

Briefly, the present invention contributes to satisfaction of the above needs and purposes by providing a manually removable bucket-shaped lower enclosure which catches and retains debris thrown from the band saw blade. Slave blade scrapers, comprising the invention claimed in co-pending patent application Ser. No. 150,854 filed May 19, 1980, and assigned to the assignee of the present application, scrape and throw debris laterally and forwardly of the band saw blade in a direction away from a lower band wheel which mounts and drives the saw blade.

The bucket-shaped, removable lower enclosure is mounted on the side of the lower band wheel to which the debris is thrown and, in addition to catching debris, provides a cover for the lower band wheel, beneath the cutting table. The convex bucket shape of the removable enclosure facilitates cleaning of the enclosure by combining the catching/retaining/bucket functions with the cover functions of the enclosure. Attachment and removal of the lower enclosure, for discarding the collected debris and/or cleaning the enclosure, is by a manually operable mounting means which can be operated without tools.

Similarly, the upper band wheel of the meat saw, over the cutting table, has a manually removable upper enclosure which forms a cover for the upper band wheel. The upper enclosure is outwardly convex to form a compartment on one side of the upper band wheel, so that removal of collected debris and cleaning of that portion of the upper band wheel housing can be accomplished in a single operation. However, the blade scrapers under the cutting table and adjacent the lower band wheel are so effective that over 95 percent of the debris is collected in the lower enclosure. Blade scrapers are therefore not necessary adjacent the upper band wheel. Likewise, wipers are not necessary for either the upper or lower band wheels.

The manually operable mounting means for the removable upper and lower enclosures are, conveniently, releasable means, such as a manually operable spring clip, for attaching one edge of each enclosure to the meat saw and cooperating elements for anchoring the opposite edges of the enclosures to the meat saw. These cooperating elements may take several forms.

In one form, the elements are comprised by a complimentary pin and groove configuration for attaching the other edge, preferably the edge opposite the spring clip, to the meat saw. In particular, a pair of pins is supported in extended position pointing toward each other on the meat saw. The groove is a semi-cylindrical groove in one face of a block supported on the lower side of each enclosure, and is positioned for receiving and being secured upon the pins when the corresponding enclosure is in position on the meat saw and the spring clip engaged. When the spring clip is disengaged, the enclosure can be rotated downwardly on the horizontal axis of rotation of a pivot defined by the pin and groove. Following this, the enclosure with the block containing the semi-cylindrical groove may easily be lifted from the pins, thus releasing the enclosure therefrom, and retaining the collected debris within the enclosure for removal from the meat saw. The process is reversed for attaching the enclosure back onto the meat saw. When the enclosure is rotated upwardly into position around the pivot, the engagement of the spring clip prevents shifting or movement of the groove and block away from the pins, so that they and the enclosure are anchored and secured thereupon.

In a second form, the cooperating elements are comprised by a bottom peripheral depending flange on the enclosures and a pair of U-shaped brackets mounted in inverted upstanding fashion upon an inturned lip of a mounting plate on the meat saw. The lower enclosure flanges and respective brackets cooperate in substantially the same manner as the grooved blocks and pins previously mentioned to anchor the lower edge of the respective enclosure to its corresponding mounting plate so as to facilitate pivoting of the enclosure relative thereto. Once the enclosure has been released at the top, it may be pivoted away from the plate and then lifted such that the enclosure bottom flange is withdrawn from between the upstanding brackets and the mounting plate. The procedure is reversed to install and reattach the enclosure on the meat saw.

It is therefore an object of the present invention to provide an improved debris collecting system for a meat saw; a system including an enclosure for such a meat saw which will collect substantially all the residue, scraps, and other debris which accumulate during meat sawing operations at a single, easily removed and easily cleaned location; in which a removable lower catching means is positioned and configured for catching and retaining the debris as it is thrown from the saw blade, and retaining the debris therein when the catching means is removed from the saw for cleaning; and to accomplish the above objects and purposes in an inexpensive, convenient, versatile and reliable configuration readily suited to use on the widest variety of meat saws.

Other objects and advantages of the invention will be apparent from the following description, the accompanying drawings and the appended claims.

BRIEF DESCRIPTION OF THE DRAWINGS

FIG. 1 is a side view of a meat saw having manually removable bucket-shaped enclosures according to the present invention, with the enclosure removal positions shown in phantom;

FIG. 2 is a fragmentary end view of the removable upper enclosure illustrating downward rotation for removal thereof from the meat saw;

FIG. 3 is a fragmentary, partially broken away and fore-shortened side view of the FIG. 2 upper enclosure;

FIG. 4 is a plan view of the mounting pins in one form of the cooperating mounting elements for the upper and lower enclosures;

FIG. 5 is a somewhat diagrammatic end view of the lower enclosure in position on the meat saw, with a grooved block in the one form of cooperating mounting elements at the lower right omitted to show the pins on which it is supported and engaged, and with the lower band wheel and the two scraper blade sub-assemblies shown in phantom engaged upon the meat saw blade, the view being taken generally on view line 5—5 of FIG. 1;

FIG. 6 is a cross-sectional view taken generally on line 6—6 of FIG. 5;

FIG. 7 is a fragmentary perspective view of the scraper blade sub-assembly at the upper left of the meat saw base, as seen in FIG. 5;

FIG. 8 is a front view of the sub-assembly shown in FIG. 7;

FIG. 9 is a side view of the scraper blade sub-assembly shown in FIGS. 7 and 8;

FIG. 10 is an enlarged side view of the second form of cooperating elements for anchoring the enclosures to the meat saw; and FIG. 11 is a front view taken along line 11—11 in FIG. 10.

DESCRIPTION OF THE PREFERRED EMBODIMENTS

With reference to FIG. 1, a band type meat saw 10 is shown having a base 12, a cutting table 14 supported on top of the base 12, and a columnar frame 15 supported on the base 12 and extending above cutting table 14. The frame 15 supports at its upper and lower portions (FIGS. 2 and 5) means in the form of upper and lower band wheels 16 and 17 for entraining an endless band saw blade 18. The lower band wheel 17 is coupled to and driven by a drive motor 19 which is also mounted on the lower portion of the columnar frame 15. The motor 19 drives the lower band wheel 17 in a direction (counterclockwise as seen in FIG. 5) which causes an exposed band saw blade flight 20 to move downwardly at the cutting table 14.

As shown in FIG. 1, the columnar frame 15, and therefore, the blade 18 mounted by the wheels 16, 17 on the frame 15, extend in tilted relationship clockwise from the vertical. The saw blade 18 is fitted to the wheels 16, 17 such that its teeth 21 face toward the right in FIG. 1. An operator stands at the right, or in front, of the saw 10 (as viewed in FIG. 1) and pushes meat products from the right to the left on the cutting table 14, through the exposed flight 20 of the band saw blade 18.

Positioned adjacent flight 20 of the saw blade 18, just below the cutting table 14 and above the lower band wheel 17, is a slave blade scraper 25 which comprises the invention claimed in aforementioned application Ser. No. 150,854 filed May 19, 1980. Another slave blade scraper 26, identical to scraper 25, is engaged and located on the other band saw flight 27 which moves upwardly within the columnar frame 15 of the meat saw 10. Flight 27 is entirely enclosed in the frame 15. Each of the blade scrapers is a subassembly which may be attached to a plate 28 mounted to the lower portion of the frame 15, for example by nuts 29 (FIG. 9).

Each slave blade scraper has a support member or mount 30 on which is supported a pivot rod 31 which in turn extends through ears 32 on the opposite lower sides of a scraper blade holder 33 for pivotally supporting the scraper blade holder 33. The holder ears 32 are spaced from the opposite ends of the mount 30 for allowing slight yieldable lateral movement of the holder 33 along the rod 31. Supported on the scraper blade holder 33, on either side of the band saw blade 18, and in contact therewith, are two resilient scraper blades 35. The scraper blades 35 each have a scraping edge 36 which is cut on a bias diagonally across the leading end of the scraper blade (FIGS. 7 and 9) so that the edge 36 contacts a respective side of the band saw blade 18 at an acute angle to the path of movement of the band saw blade 18. The blade holder 33 mounts the scraper blades 35 at an angle with respect to each other and to the saw blade 18 so that the blades are biased toward each other at their scraping edges 36 and the scraping edges will lie flat against the opposite sides of the saw blade 18.

The mounting arrangement of the scraper blades 35 relative to the saw blade 18 closely resembles a snowplow in which the scraping edges 36 are oriented to face into the direction of movement of the saw blade to scrape debris therefrom and throw it laterally and forwardly of the band saw blade 18 in a direction away from the lower wheel 17. The scraping blades 35 are mounted so as to place the longest dimension of the blade 35 closest to the mount 30 (i.e., closest to plate 28, as shown in FIG. 9), so that the blade length then becomes progressively shorter across the width of the blade, as seen moving outwardly from the mount 30.

As the band saw blade 18 passes between the scraper blades 35, it tends to push them, due to frictional drag, in the same direction as the band saw blade is moving. The pivot rod 31 defines a pivot having an axis of rotation behind the center line of the band saw blade (FIG. 9), and substantially transverse to the direction of movement of the flight of the band saw blade on which the particular slave blade scraper is engaged. The force which the band saw blade imparts to the scraper blades, and through them to the scraper blade holder 33, tends to rotate them about the pivot rod 31 in the direction of movement of the saw blade. As illustrated in FIG. 9, this force F tends to rotate the assembly clockwise about the pivot rod 31. To limit this rotation, a carbide stop 38 is also carried on holder 33. The stop 38 is positioned for engaging the rear edge of the band saw blade 18 when the scraper blades 35 and blade holder 33 are rotated by force F to exactly the position in which an outer end 39 of the scraping edge 36, opposite an inner scraping edge end 37 is substantially adjacent to but inwardly of the gullets of the teeth 21 of the saw blade 18 (FIGS. 7 and 9). It has been found that optimum cleaning performance results when the scraping edges scrape as near as possible to the area of the tooth gullets. Deviations from this position, as small as 1/32 inch in some meat saws, can result in disappointing performance.

The scraping edge 36 effectively ends at point 39, since beyond that point the edges of the scraper blades angle outwardly or are beveled at 44 (FIGS. 7 and 8) to provide clearance for the saw blade teeth and facilitate easy insertion of the band saw blade 18 into the scraper assembly between the scraper blade 35. The leading scraping edges 36 of the scraper blades 35 are in contact with one another prior to insertion of the band saw blade 18 therebetween, whereas the beveled forward tips 44 of the scraping edges 36 form an inverted V configuration for receiving the band saw blade 18 to guide its insertion between the scraper blades 35.

In a typical meat saw and in some cutting conditions, the saw blade 18 may be moved as indicated by the double headed arrows pointing left and right in FIG. 9. Every time a piece of meat is pressed against the saw blade (from right to left as shown in FIG. 9), the blade deviates from its neutral or equilibrium position (moving to the left as shown in FIG. 9). The slave blade scrapers automatically and precisely follow this movement. As the blade moves to the left (FIG. 9), stop 38 likewise rotates the blade holder 33 and scraper blades 35 to follow the movement of the saw blade 18 exactly. When the saw blade 18 returns to the right, force F then rotates the scraper blades 35 in the other direction to keep stop 38 in contact with the rear edge of the band saw blade 18, and the scraping edges 36 always in the proper position relative to the band saw blade.

As the debris is thrown forward and laterally away from the band saw blade 18 and the lower band wheel 17, it is caught for subsequent convenient disposal in removable catching means which comprise the subject matter of the present invention. The catching means is actually a removable lower enclosure 40 for the lower band wheel 17 which mounts on the lower plate 28. Lower enclosure 40 has an external outwardly convex bucket-shaped contour which extends outwardly and downwardly when mounted in position as seen in FIG. 1, and forms a bucket-shaped compartment on the operator's side of the lower band wheel 17. The enclosure 40 includes a bottom 41 which slopes downwardly and away from the lower band wheel 17 to catch and retain the debris at a location away from the lower band wheel.

By combining the debris-collecting function with the wheel-and-blade-covering function in the lower enclosure 40, several advantages are obtained. First, it is not necessary to provide a separate and distinct debris collecting bucket, nor special mounting and supporting structure therefor. Secondly, even though the blade scrapers 25 and 26 direct most of the debris along reasonably well defined paths, some scattering of the debris is inevitable. The smaller the bucket, the smaller the "target." Thus, by making the entire enclosure 40 serve this purpose, not only is the bucket eliminated, but it is assured that the greatest amount of debris will be caught in the removable enclosure 40 itself.

The entire lower enclosure 40 is mounted on the plate 28 attached to frame 15 for convenient manual removal whenever desired. This not only facilitates removal of the debris and cleaning of the enclosure, but, by better exposing the entire underside of the table 14, eases the cleaning of the entire saw 10 as well.

Similarly, an upper enclosure 42 is mounted for easy manual removal and attachment to an upper plate 43 which, in turn, is mounted to the columnar frame 15. The upper enclosure 42 is located on the operator's side of the meat saw 10, and consists of an outwardly convex cover which forms a compartment on the operator's side of the upper band wheel 16. No blade scrapers are provided in the upper enclosure 42 since the two blade scrapers 25 and 26 associated with the band saw blade 18 in the lower enclosure 40 have been found to remove more than 95 percent of the scraps and debris and cause collection of the same in the lower enclosure 40.

For manually removing and reattaching the enclosures 40 and 42, each has a pair of buttons 49 on the top which are received in corresponding holes in spring clips 50 mounted on the top edge of the respective plates 28 and 43 of the meat saw 10. Adjacent the opposite sides of the plates 28 and 43 and enclosures 40 and 42 at the peripheral bottom edges thereof are cooperating elements for anchoring the enclosures 40, 42 to the respective plates 28, 43, as each of the enclosures is pivoted toward and away from its corresponding plate in attachment and removal of the enclosures to and from the meat saw 10. These cooperating elements may take several forms.

In a first form, the elements comprise a pair of blocks 55, each having a semi-cylindrical groove 56 in the face thereof opposite the enclosure 40 or 42. When the enclosures are in attached position mounted to the plates on the meat saw 10, the grooves 56 engage, receive, and are secured upon a pair of pins 57 (FIG. 4) which are supported in extended position from the plates 28 and 43 on the meat saw 10, as may be seen in FIGS. 3 and 6. The blocks 55 are firmly held upon the pins 57 by the spring clips 50 when the buttons 49 are snapped into position in the spring clips. This captures the enclosures between the pins and the spring clips. Of course, the spring clips and buttons could be reversed, as well as the pins and blocks, if desired.

To remove a housing, it is necessary only to lift the corresponding pair of spring clips 50 to release the buttons 49 on that enclosure. The pins 57 and groove 56 are oriented to define a pivot and a horizontal axis of rotation (see FIG. 2) around which the cover is then downwardly rotated to move the buttons away from beneath the spring clips 50. When the enclosure is thus rotated around the axis of rotation of groove 56 and pins 57, the blocks 55 can easily be lifted away from the pins, and the collected debris is retained therein for removal from the meat saw. The enclosure is reattached by reversing the process, engaging the grooves 56 on the pins 57, rotating the enclosure upwardly around the axis which they define, and sliding the buttons 49 under the spring clips 50 until they snap into the holes therein.

In a second form, the cooperating elements are comprised by a bottom peripheral depending flange on the enclosures, only the flange 60 on the lower enclosure 40 being shown in FIG. 10, and a pair of U-shaped brackets 62 mounted in inverted upstanding fashion upon an inturned lip 64 on the bottom edge of each of the plates 28, 43, only one of the brackets 62 on the lower plate 28 being seen in FIGS. 10 and 11. The lower flange 60 and brackets 62 cooperate in substantially the same way as the grooved blocks and pins previously described to anchor the lower edge of the respective enclosures to its corresponding plate so as to facilitate pivoting of the enclosure relative thereto. Once the enclosure has been released at the top, it may be pivoted away from the plate and then lifted such that the flange 60 is withdrawn from between the bracket 62 and plate 28 or 43. The procedure is reversed to install and reattach the enclosure on the meat saw with the flange 60 first being inserted between the brackets 62 and plate 28 or 43, and the enclosure then rotated toward the respective plate until the buttons 49 are snapped into position in the spring clips. As above, the enclosure is captured between the brackets 62 and spring clips 50.

As may be seen, therefore, the removable catching means of the present invention has numerous advantages. Principally, it collects the scrap debris from the meat saw in a highly efficient and convenient manner, and provides for quick and easy removal of the debris and cleaning of the meat saw. The slave blade scrapers precisely follow deviations in the saw blade position and deflect and throw the debris laterally away from the meat saw blade and the lower band wheel, where the lower enclosure then catches and retains it, so that redeposition of the debris onto the band saw blade is virtually eliminated. When either the lower or upper enclosure and area of the meat saw covered thereby is to be cleaned, either paritally or completely, the corresponding enclosure can be quickly and easily removed simply by releasing a pair of spring clips and rotating the enclosure away therefrom. Then, either that enclosure alone can be cleaned, just to remove accumulated scrap debris, or, as at the end of the day, the entire meat saw can be cleaned. In either case, it will be appreciated that a separate scrap collecting bucket has effectively been eliminated, so that there are fewer components to be cleaned. Also, when the enclosures are removed, the band saw 10 is more completely accessible for cleaning. Further, the tilted position of the columnar frame 15 of the meat saw, as shown in FIG. 1, is such that the axes of rotation of the band wheels 16 and 17 are inclined from the horizontal. This helps to avoid redeposition by locating the lower band wheel 17 other than directly beneath the blade scrapers 25 and 26.

While the form of apparatus herein described constitutes a preferred embodiment of the invention, it is to be understood that the invention is not limited to this precise form of apparatus, and that changes may be made without departing from the scope of the invention.

What is claimed is:

1. For use in a band saw having a frame, a band saw blade for cutting products such as meat or the like, means mounting said blade for movement relative to said frame, said mounting means including a band wheel rotatably mounted on said frame and movably supporting said blade, removable catching means for catching and retaining debris produced during said cutting of products for subsequent removal from said saw, said removable catching means comprising:

a. an enclosure for substantially covering said band wheel, said enclosure having an external shape forming a compartment about at least one side of said band wheel; and b. manually operable mounting means for manually mounting and removing said enclosure on and from said one side of said band wheel without the use of tools and having means defining a pivot on said frame for rotating said enclosure downwardly around a lower end thereof, as said enclosure is being removed from the band saw while retaining the collected debris within said compartment for removal from the band saw.

2. The removable catching means of claim 1 wherein said manually operable mounting means further comprises means for attaching and detaching an upper end of said enclosure to said frame.

3. The removable catching means of claim 1 wherein said manually operable mounting means further comprises manually operable spring clip means mounted on one of said frame and said enclosure and engageable with and disengageable from elements on the other of said frame and said enclosure for attaching and detaching an upper end of said enclosure to said frame.

4. The removable catching means of claim 1, 2, or 3 wherein said manually operable mounting means further comprises means for rotatably anchoring a lower end of said enclosure to said frame, as said enclosure is being removed from the band saw while retaining the collected debris within said compartment for removal from the band saw.

5. The removable catching means of claim 4 wherein said means for rotatably anchoring said lower end of said enclosure to said frame includes cooperating elements on both said enclosure and said frame which removably interfit while allowing for rotational movement of one relative to the other.

6. For use in a band saw having a frame, a band saw blade for cutting products such as meat or the like, means mounting said blade for movement relative to said frame, said mounting means including upper and lower band wheels spaced apart and rotatably mounted on said frame and movably supporting said blade, removable catching means for catching and retaining debris produced during said cutting of products for subsequent removal from said saw, said removable catching means comprising:

a. a lower enclosure cooperable with said frame for substantially covering said lower band wheel and having a bucket-shaped portion at one side of said lower band wheel for collecting and retaining debris at a location away from said lower band wheel; and b. lower manually operable mounting means for manually mounting and removing said lower enclosure on and from said one side of said lower wheel, said lower mounting means including means defining a first generally horizontal pivot axis on said frame about which said lower enclosure is rotated during mounting to and removal from said frame of said saw.

7. The removable catching means of claim 6 wherein said means defining said first horizontal pivot is located along a lower end of said lower enclosure.

8. The removable catching means of claim 6 further comprises:

a. an upper enclosure cooperable with said frame for substantially covering said upper band wheel and having a compartment portion at one side of said upper band wheel; and b. upper manually operable mounting means for manually mounting and removing said upper enclosure on and from said one side of said upper wheel, said upper mounting means including means defining a second generally horizontal pivot axis on said frame about which said upper enclosure is rotated during mounting to and removal from said frame of said saw.

9. For use in a band saw having a frame, a band saw blade for cutting products such as meat or the like, means mounting said blade for movement relative to said frame, said mounting means including a band wheel rotatably mounted on said frame and movably supporting said blade, removable catching means for catching and retaining debris produced during said cutting of products for subsequent removal from said saw, said removable catching means comprising and having manually operable spring clip means engageable for attaching one edge of said enclosure to the frame of said band saw and pin and groove means for attaching another edge of said enclosure to said band saw, said pin and groove means each including:

(i) pin means supported in extended position on one of said enclosure and said band saw frame, and (ii) complementary groove means defining a groove on the other of said enclosure and said band saw for receiving and securing said pin means therein when said enclosure is in position on said band saw and the spring clip means is engaged, and for releasing said pin means from said groove means when said spring clip means is disengaged.

* * * * *